United States Patent
Huchegowda et al.

(10) Patent No.: US 10,713,152 B2
(45) Date of Patent: Jul. 14, 2020

(54) AUTOMATED PATH GENERATOR FOR OPTIMIZED APPLICATION TESTING

(71) Applicant: SAP SE, Walldorf (DE)

(72) Inventors: Suvarna Byrapura Huchegowda, Bangalore (IN); Aparna Vohra, Bangalore (IN)

(73) Assignee: SAP SE, Walldorf (DE)

( * ) Notice: Subject to any disclaimer, the term of this patent is extended or adjusted under 35 U.S.C. 154(b) by 9 days.

(21) Appl. No.: 15/635,496

(22) Filed: Jun. 28, 2017

(65) Prior Publication Data

US 2019/0004934 A1    Jan. 3, 2019

(51) Int. Cl.
G06F 9/44 (2018.01)
G06F 11/36 (2006.01)

(52) U.S. Cl.
CPC ...... G06F 11/3684 (2013.01); G06F 11/3664 (2013.01)

(58) Field of Classification Search
CPC .......... G06F 8/30; G06F 11/323; G06F 8/443; G06F 11/3688; G06F 11/3664; G06F 11/3684; G06F 11/3466; G06F 11/3636; G06F 11/3409
See application file for complete search history.

(56) References Cited

U.S. PATENT DOCUMENTS

| | | | | |
|---|---|---|---|---|
| 6,885,953 B2 * | 4/2005 | Farkas | ................. | G01R 13/029 702/119 |
| 7,797,687 B2 * | 9/2010 | Tillmann | ............ | G06F 11/3684 714/38.14 |
| 8,949,795 B2 * | 2/2015 | Chandra | ............. | G06F 11/3676 717/124 |
| 9,317,410 B2 * | 4/2016 | Eilam | ................. | G06F 11/3688 |
| 9,569,335 B1 * | 2/2017 | Boehm | ............... | G06F 11/3604 |
| 9,600,401 B1 * | 3/2017 | Haischt | .............. | G06F 11/3664 |
| 2005/0028036 A1 * | 2/2005 | Shibata | ............... | G06F 11/3664 714/38.13 |
| 2009/0019427 A1 * | 1/2009 | Li | ........................ | G06F 11/3676 717/126 |
| 2013/0007711 A1 * | 1/2013 | Fryc | .................... | G06F 11/3672 717/124 |
| 2014/0059522 A1 * | 2/2014 | Chandra | ............. | G06F 11/3684 717/126 |
| 2014/0189653 A1 * | 7/2014 | Larson | ................ | G06F 11/3604 717/125 |

(Continued)

*Primary Examiner* — Jae U Jeon

(74) *Attorney, Agent, or Firm* — Fish & Richardson P.C.

(57) ABSTRACT

An application module is read and parsed into a text file to store source code lines included into the implementation of the application module. The text file is analyzed and predicate conditions are identified in one or more of source code lines. Key values associated with a predicate condition from the predicate conditions are determined. Key values are associated with a key field defined for the application module. A plurality of paths of execution of the application module is determined based on the text file analysis and on the determined predicate conditions. A path includes one or more lines from the source code lines corresponding to a sequence of execution steps of the application module. Based on determining key values for the predicate conditions and the plurality of paths, generating test cases corresponding to the path and corresponding predicate conditions.

17 Claims, 6 Drawing Sheets

(56) References Cited

U.S. PATENT DOCUMENTS

2014/0282433 A1\* 9/2014 Eilam ................. G06F 11/3676
　　　　　　　　　　　　　　　　　　　　　　　717/131
2016/0217062 A1\* 7/2016 Singi ................... G06F 11/3664
2018/0095865 A1\* 4/2018 Rogalla ............... G06F 11/3684
2018/0144276 A1\* 5/2018 Neravati ............. G06Q 10/063

\* cited by examiner

AUTOMATED PATH GENERATOR FOR OPTIMIZED APPLICATION TESTING

BACKGROUND

Software development lifecycle imposes a structure for development of software products. There are different models describing possible approaches for handling development activities during the development lifecycle. The activities may include development planning, design, testing, preparing of product documentation, implementation, etc. The activities may be defined with consideration to the type of software product that is developed and specific software product requirement. A structured approach for developing applications may increase the quality of the software product, the customers' satisfaction, and the sales revenues. One aspect of delivering quality applications is the process of comprehensive testing. The testing process may ensure a consistent user experience with appropriate software behavior during execution under different user case scenarios.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Embodiments of techniques for automated path generation for optimized application testing are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
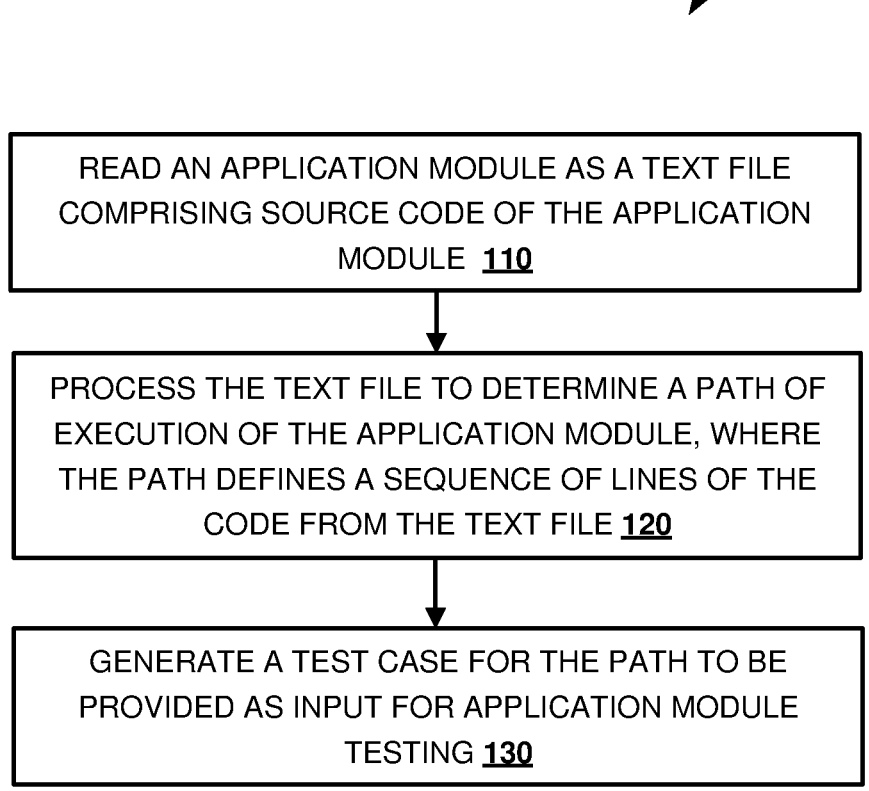
FIG. 1 is a flow diagram illustrating a process for automated path generation of execution scenarios for an application module, according to one embodiment.

FIG. 1 is a flow diagram illustrating process 100 for automated path generation of execution scenarios for an application module, according to one embodiment. An application module may be developed to provide services and resources for consumption by end users according to an application specification. The specification may define expected behavior of the execution of the application module. Based on the specification, the application module may be implemented to include source code defined according to a programming language and developing techniques of different types. The implementation of the application module may also include implemented logic associated with predefined source code lines, source code templates, models, etc. The implemented source code lines for the application module may be based on a selected technology for developing the application. For example, the source code lines may be based on a standard programming language associated with the selected technology and a selected runtime environment for running the application module. The application module may be deployed and may run on a server instance, which provides required resources for hosting the application module.

When an application module is hosted, it may be accessed from external locations. For example, the application module may include a user interface (UI) including a number of input fields, where an end user may provide values. Based on the application module's logic, the input field values provided are evaluated and output results may be provided on the UI as an output. However, implemented application module's logic may not perform according to specification. Expected application module's behavior during execution may be different from the actual behavior when the application module is running. For example, evaluation of the input field values may not provide correct output results. Therefore, testing activities for the performance and execution of the application module may be performed.

In one embodiment, when testing the application module, an optimized number of use cases may be created to determine test results and define a final rate of performance of the application module. The number of use cases to be tested may be determined so that they cover most or even all of the source code lines defined during development of the application module. When source code lines are analyzed for test case determination, and test cases are executed, it may be determined that some lines of code are not executed at all, or that some code lines refrain from the expected behavior of the module's execution, or that defined computations and computer implemented algorithms are error prone (e.g. in corner case scenarios), etc. Therefore, the source code lines might be updated after testing activities, which point out to specific problems. Test cases defined for the application module may be based on analysis of the source code lines and a determined number of values for simulation of application module's execution. For a test case, a number of values may be used for application module execution under testing, to encompass different test case scenarios.

At 110, an application module is read as in a text format, for example as a text file. The application module may be provided as a deployable unit and may be read to determine source code lines defining implementation logic of the application module. The read source code lines may be parsed when read into the text file. In one embodiment, the application module may be an entire application, may be part of an application, such as a function or algorithm, or may be a set of coupled functionalities provided by an application. A generated text file may include source code of the application module.

At 120, the text file is processed to determine a path of execution of the application module. Source code lines defined at the text file may be associated with consecutive numbers. The source code lines may be evaluated and interpreted to determine a number of sequences of execution of lines during runtime of the application module. A sequence of execution of lines defines an order of execution of the lines, for example—line 1, line 5, line 6, line 7, line 8, line 12. The sequence corresponds to sequence of execution steps, when the application module is running under a particular use case scenario. A sequence of code lines from the text file may be denoted as a path of execution. The sequence may define an order of execution, where the lines do not have to be with a consecutive numbered lines within the text file. The determination of the path may be based on iterative evaluation of source code lines and interpreting logic within code lines where conditional statements are defined. Such conditional statements are evaluated at runtime during execution of the application module. Conditional statements may be associated with key fields, which may be associated with input fields provided at the UI of the application module. A source code line associated with a conditional statement may define a number of key field values that may be evaluated during execution of the application module. For example, a conditional statement may be defined to represent logic for evaluation of a predicate (e.g. 'a' is equal to 5, where 'a' corresponds to a defined key field) and perform operations based on a true or false result from the evaluation. When 'a' is equal to 5, then output value x is equal to sum of a and b. When a is not equal to 5, then output value is equal to b. In the exemplary conditional statement, the key field is field "a" and a computed value for the key field "a" is compared to the key field value of 5. Key field for such a conditional statement is the field corresponding to 'a', which value is evaluated based on the defined predicate logic.

In one embodiment, conditional statements in source code lines may be interpreted to be associated with one or more evaluation results that may trigger different execution steps. For example, a conditional statement may include a predicate associated with a true or false output values. When the predicate is evaluated to true based on a provided input value, then a set of source code lines may be executed. When the predicate is evaluated to false based on the provided input value, then a different set of source code lines may be executed. In one embodiment, execution of source code lines of an application module may be defined through a graph data structure (e.g., a tree data structure), where a node from the graph corresponds to a source code line, and an edge between two nodes may be a directed edge defining order of execution of source code lines at the two nodes. For such a data structure, a first node may be the first source code line. A node from the graph structure may be associated with one or more than one child nodes, e.g., when the node corresponds to a source code line including a predicate condition. The graph structure may include cycles. In the graph structure with cycles, a path including a cycle is associated with processing of one source code line more than once.

In one embodiment, a number of paths may be determined to cover different variations of combinations of source code lines. For example, a text file may include 10 lines, where a first path covers lines 1, 4-6, and 10, and the second path covers lines 1-3, 7-10. In such manner, all of the source code lines from the text file are included in the determined two paths. The two paths represent variations of combination of source code lines, where one combination defines a sequence of execution steps of the application module.

In one embodiment, a graph structure including a number of paths may be defined. The graph structure may be a tree structure. A path from that tree structure is a path starting at a root node of the tree structure to a leaf node. The tree data structure may be defined to include lines from the source code as nodes, where a root node may be a first source code line as determined from the text file. There may be more than one leaf nodes for the tree data structure. The tree data structure may include one source code line that is associated with more than one node, where different paths suggest processing of the same source code line. The root node of the tree structure is included in the different paths as a starting point of the application module's execution.

At 130, a test case is generated for the determined path. The test case is provided as an input for testing the application module. The test case is generated based on a determined path, e.g., based on evaluation of one or more source code lines that include conditional statements associated with key values.

Figure 2:
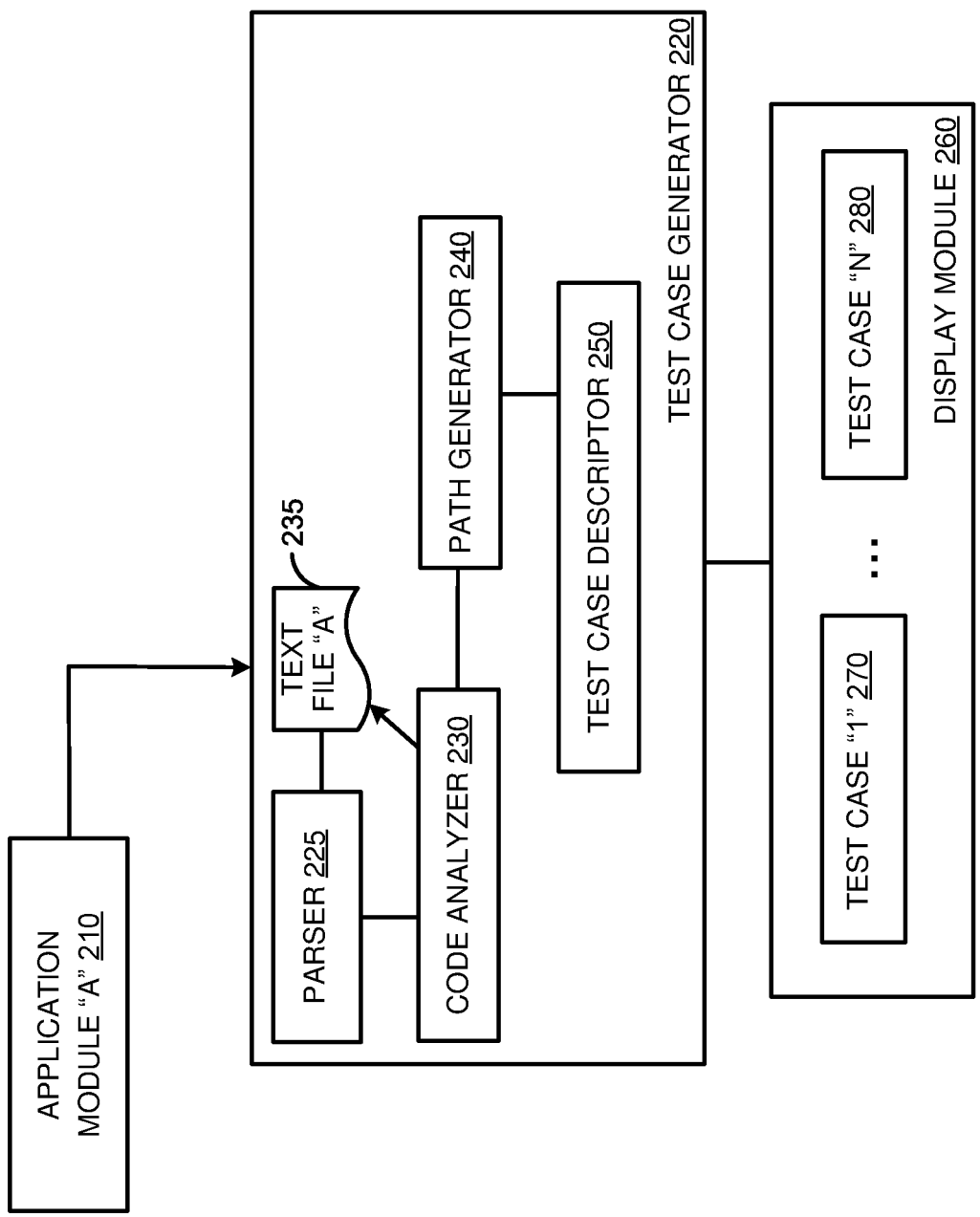
FIG. 2 is a block diagram illustrating a system for automated path generation based on source code analyzed for performing optimized application testing, according to one embodiment.

FIG. 2 is a block diagram illustrating a system 200 for automated path generation based on source code analyzed for performing optimized application testing, according to one embodiment. An application module "A" 210 is provided for testing purposes to a test case generator 220. The application module "A" 210 may be such as the described application module in relation to FIG. 1. The test case generator 220 includes processing modules such as parser 225, code analyzer 230, path generator 240, and test case descriptor 250.

The test case generator 220 communicates with the application module "A" 210 to read it and to parse it through parser 225. When the application module "A" 210 is read and parsed, a text file "A" 235 is created to include source code lines of the application module "A" 210. The text file "A" 235 is analyzed by a code analyzer 230. The code analyzer 230 may analyze source code lines to define numbering of the source code lines. The code analyzer 230 may further iteratively process the numbered lines to identify predicate conditions associated with one or more source code lines. The defined predicate conditions may be associated with determining different paths of execution of the application module "A" 210. The code analyzer 230 may also determine key values to be associated with the predicate conditions. For example, a predicate condition may define a rule for processing a set of source code lines. The defined rules may be associated with a condition and key values, such as, when "x" is equal to 10, 20, 30 and 40. The key values are 10, 20, 30 and 40, and they are mapped to the field "x", where the condition in the rules is "equal to", which suggests a comparison between the field value and the key values.

In some embodiments, some of the predicate conditions may be associated with input field and received input values, e.g., received at a UI of the application module "A" 210. In such cases, the field value is an input field value defined for the application module "A" 210.

In some embodiments, some of the predicate conditions may be associated with internally defined key field, where key field values are computed based on implemented logic of the application module "A" 210 rather than received from an external source. A field value may be a value determined during runtime of the application module "A" 210. In such manner, the field value may be computed based on internally defined computation methods at previous source code lines, which lines are processed before the source code line including the predicate condition.

In one embodiment, the code analyzer 230 communicates with the path generator 240. The path generator 240 received the identified predicate conditions and key values from the source code lines in the text file "A" 235 from the code analyzer 230. Based on the provided input, the path generator 240 defines a number of paths of execution of the application module. A path of execution may include one or more lines from the source code lines in the text file "A" 235, or may include a reference to those lines based on the determined numbers for the source code lines. The path of execution defines a sequence of execution steps of the application module that cover a use case of provided services and/or functionality by the application module. Such a use case may be defined as a test case for testing purposes before releasing an application module.

The paths defined by the path generator 240 are based on source code lines. The graph data structure may be a directed graph created to include nodes and directed edges. The nodes may represent the source code lines and the directed edges may represent an order of processing. The graph data structure may be organized to define a set of paths corresponding to possible execution steps for the application module. A path from the graph is an execution path and starts at a root node of the graph and traverses nodes through defined directed edges between nodes until a leaf node is reached. A directed edge at the graph structure defines a subsequent order of execution of the connected nodes associated with a source code line, which may be identified and/or referred to by its number. A node that is related to more than one child nodes may be a node associated with a predicate condition. Such predicate condition nodes are evaluated at runtime of the application module "A" 210 based on key values defined in relation to the predicate condition in the source code. Values for a key field associated with the predicate condition are determined, e.g. implemented logic at the application module. Such determined values are evaluated based on the associated key values. The path generator 240 may include logic for automatic determination of a number of paths that cover an optimized number of source code lines of the application module. In one embodiment, percentage of source code lines that are covered through the number of paths may be maximized to include all of the source code lines that may be invoked to provide functionality defined for the application module. Source code lines included in the paths may exclude dead code from all of the source code lines defined for the application module. For example, dead code may be a section in the source code, which may be executed, but is not associated with providing output results for the application module. Dead code may not be associated with determining alternative execution scenarios. Definition of paths based on source code analysis may ensure highest code coverage during testing activities. The generated paths are defined based on the source code, and therefore code coverage of test cases run based on the generated paths is improved.

Further, if dead code is part of the source code of the application module, through analysis, it may be identifier. When dead code is identified, the implementation of the application module including the source code may be modified and improved. For example, dead code may be excluded from the source code for the application module.

In one embodiment, based on generated paths from the path generator 240, test case descriptor 250 defines a number of test cases that may be executed on a running instance of the application module "A" 210. The test case descriptor 250 may read a path defined by the path generator, and describe a series of steps for interaction and execution at the application module "A" 210 to achieve a particular output. The test case descriptor 250 utilizes input for the test cases based on the paths provided by the path generator 240 to ensure highest code coverage of testing of the application module "A" 210. In such manner, the tests to be executed are designed for testing the lines from the source code.

The defined steps for the test case, may be associated with providing input to the application module "A" 210. The description of a test case may include details for an expected result from the execution of the test case, which may be used as criteria for evaluation of the result of execution of the test case. For example, the application module "A" may include two input fields A and B, where values provided at these input fields are evaluated based on the implemented logic at the source code lines.

For example, the source code lines include a predicate condition evaluating the value provided at A, and when that value is greater than 10, then a sum of the values provided at fields A and B is provided as an output, e.g., on the UI of the application module "A" 210. When the value of A is lower than 10, then the result is set to 0. A path covering the sequence of execution steps associated with the evaluation of the input value received at A and determining an output, will include source code lines with the definition of the predicate condition and the definition of the logic for the computation of the output. The predicate condition for such a path is the evaluation to whether a value provided at key field A is greater than 10. The key value is 10, and the key field is A for this example. Then a test case, for that path, may be defined to include an input field value for field A to be the value of 20. Then, during the execution of the application module "A" 210, it will be requested to provide an input field values for A and B, and a test case step may be defined that A is equal to 20 and B is equal to 10. The test case description may specify an expected output result to be user to determine correctness of execution. Then at the execution of logic associated with the predicate condition, the input value provided for key field "A" is compared to the key value 10, and a result of the comparison determines that the condition is satisfied, as 20 is greater than 10. Then the execution of application module "A" 210 may proceed to determine the sum of 20 and 10 and define a result of 30. The result from the test case at the application module "A" 210, may be compared with the expected result. When the expected and the actual result are identical, the test case result may be classified as positive. Otherwise, it may be classified as negative.

Results from executed test cases may be provided to a display module 260 in communication with the test case generator 220. For example, the display module 260 may preview a test case result 270 for test case "1" and test case results for test case "N" 280. Test case results may be associated with a test case described at the test case descriptor 250, and may be mapped to a path defined at the path generator 240. The test cases results as displayed on the display module 260 may also provide details for the execution of the tests and determination whether a result of a test is positive or negative. When a test is executed, a flow of testing steps is performed according to different test scenarios testing different functionality provided by the application module "A" 210. When the application model "A" 210 is tested under a test case, the result from the test may be positive, when the achieved result from the execution of the application module "A" 210 is the expected result as defined at the test case description at the test case descriptor 250.

Figure 3:
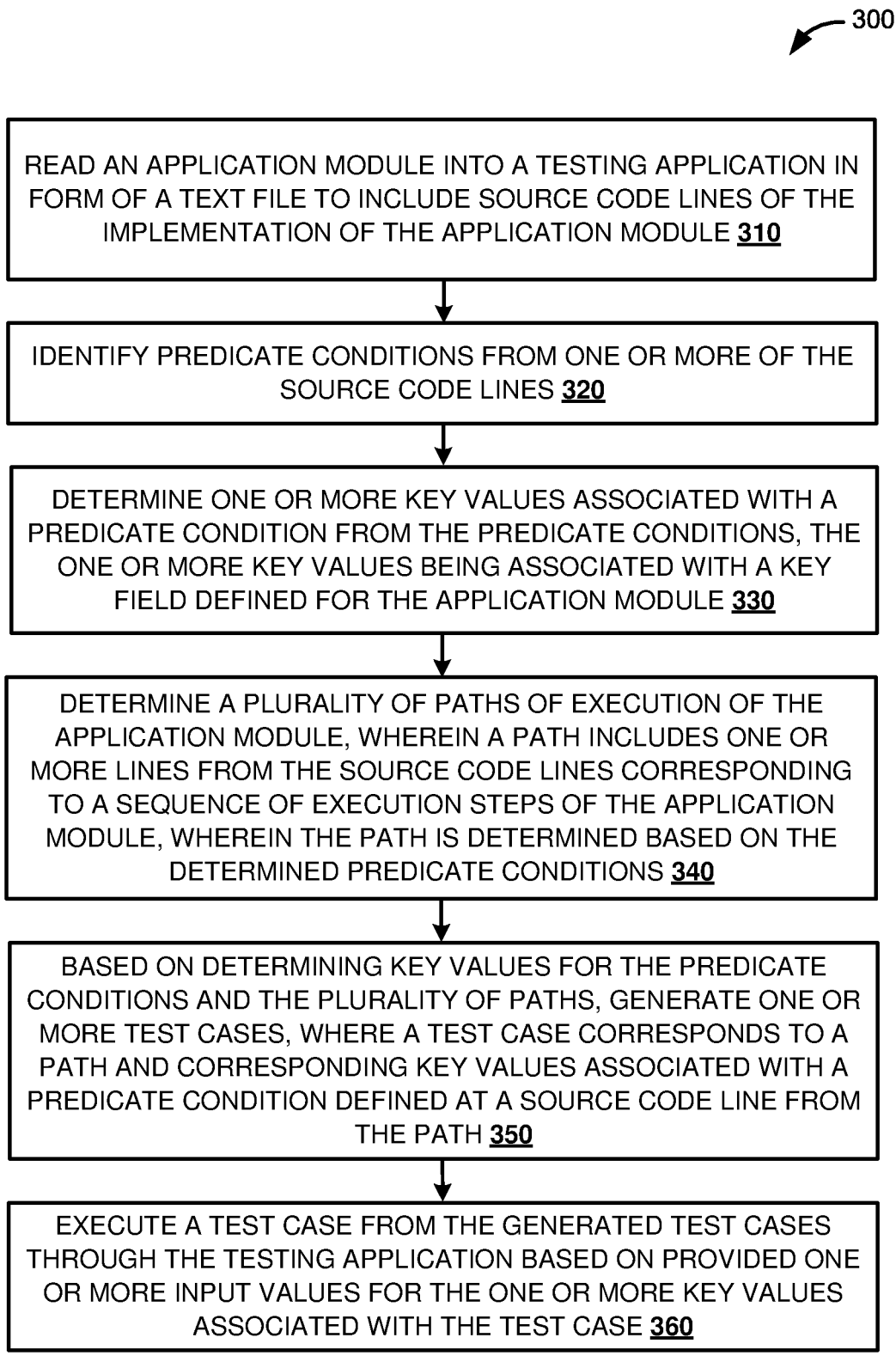
FIG. 3 is a flow diagram illustrating a process for testing application execution based on path generation for optimized source code testing coverage, according to one embodiment.

FIG. 3 is a flow diagram illustrating a process 300 for testing application execution based on path generation for optimized source code testing coverage, according to one embodiment. Application module's execution may be tested based on source code analysis and path determination, as described in relation to FIGS. 1 and 2. At 310, the application module is read into a testing application. The testing application may include functionality similar to the functionality defined at the test case generator 220, FIG. 2. The application module is read and source code lines of the implementation of the application module are to be stored into a text file. The source code lines of the application modules are parsed the text file to determine numbering of the source code lines. At 320, predicate conditions are identified from one or more of the source code lines. Predicate conditions may include conditional statements that are associated with key values defined for key field. At 330, one or more key values are determined in association with a predicate condition from the identified predicate conditions at 320. The key values may be associated with a key field defined for the application module. For example, the key field may be input field for the application module. Input fields may be provided at an UI of the application module. User interaction may be received at the UI in relation to include input field values for the input fields to be processed in relation to the defined key values at condition statements during their evaluation.

At 340, a set of paths is determined. In one embodiment, the determination of the paths may be performed as described in relation to FIG. 2. The defined plurality of paths is determined for the execution of the application module. A path may include one or more lines from the source code lines of the application modules. The one or more lines from the source code lines may correspond to a sequence of execution steps of the application module. The path may be defined based on the determined predicate conditions part of the source code lines. As discussed in relation to FIG. 1 and FIG. 2, paths of execution of an application module may be defined as paths from a root node to an end node in a graph data structure, e.g., a tree data structure.

At 350, based on determining key values for the predicate conditions and the plurality of paths, one or more test cases are generated. A test case corresponds to a path and corresponding key values associated with a predicate condition defined at a source code line from the path. The test cases may be defined as described above in relation to FIG. 2 and the test case descriptor 250. At 360, a test case from the generated test cases is executed at the testing application based on provided one or more input values for the one or more key values associated with the test case. The key values associated with the test case are key values associated with a predicate condition from the predicate conditions (defined at 320) from source code lines of a corresponding path for the test case.

Figure 4:
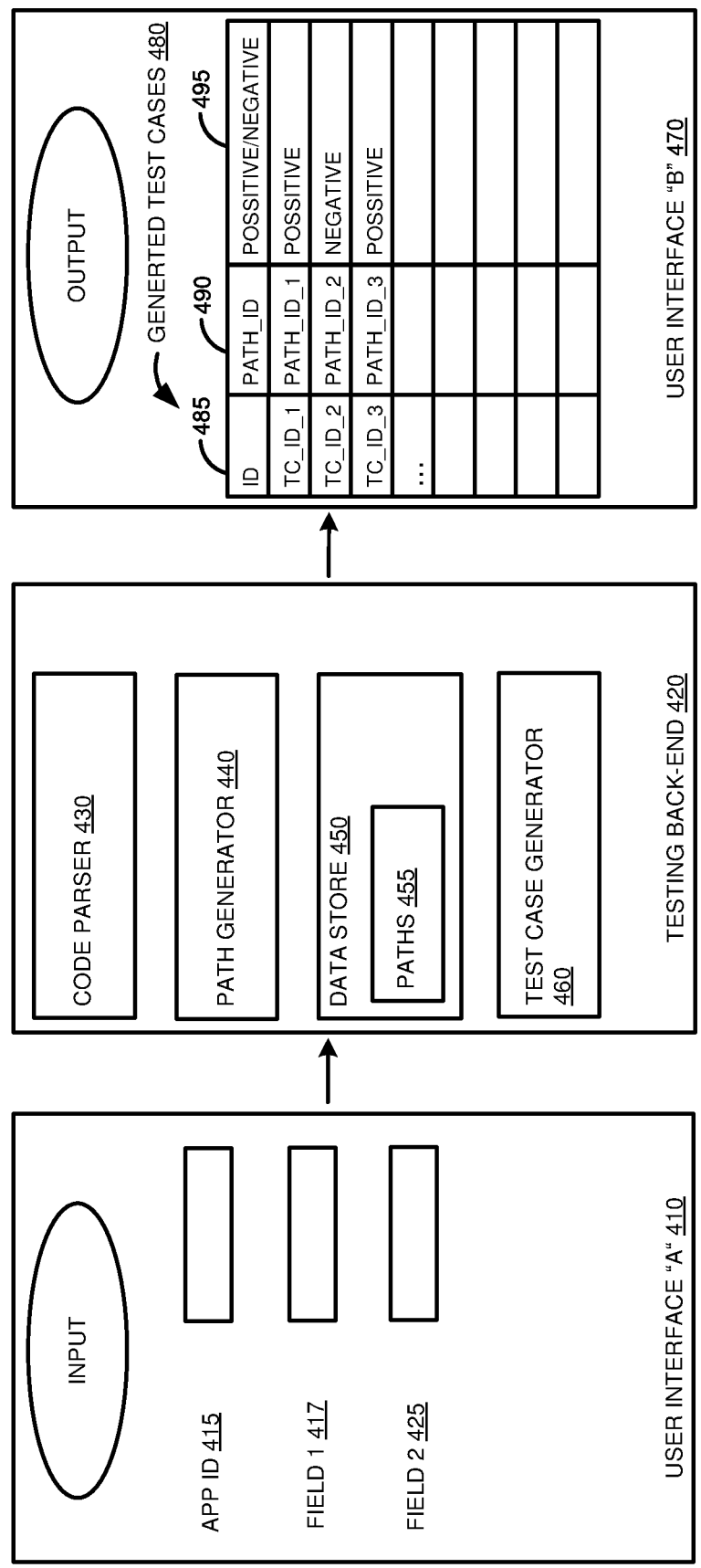
FIG. 4 is a block diagram illustrating a testing application for testing application execution based on path generation and correspondingly defined test case, according to one embodiment.

FIG. 4 is a block diagram illustrating a testing application for testing application execution based on path generation and correspondingly defined test case, according to one embodiment. In one embodiment, the application under testing may include a UI, such as UI "A" 410. In another embodiment, the UI "A" 410 may be a replication of the UI of the application under testing, and may be part of the testing application to facilitate simulation of application execution during testing activities. The UI "A" 410 includes input fields such as App ID 415, Field 1 417, and Field 2 425. Test input values may be provided through the input fields at the UI "A" 140 to be mapped to testing cases that are executed through the testing back-end 420.

The testing application may include testing back-end 420. The testing back-end 420 may include implemented testing logic for generating test cases based on determined paths of execution of an application module to be tested. The testing back-end 420 may correspond to the described test case generator 220 in relation to FIG. 2. The testing back-end 420 includes code parser 430, path generator 440, data store 450, and test case generator 460. The code parser 430, path generator 440, and test case generator 460 may be such as the described parser 225, path generator 240, and test case descriptor 250 in relation to FIG. 2. The testing back-end 420 may be associated with an application for testing purposes. The tested application may include the UI "A" 410 and may be analyzed by the code parser 430 to determine source code lines associated with the implementation of the tested application. The path generator 440 determines paths for the source code lines as described above in relation to path generator 240 and code analyzer 230 at FIG. 2. The testing back-end 420 stores defined paths through the path generator 440 at paths 455 at the data store 450. The paths 455 include definitions of paths, which may include a definition to a sequence order of source code lines, which code lines may be referred to by their number A UI "B" 470 is associated with the testing back-end app 420 and is provided for displaying of results for executed test cases through the testing back-end 420. The UI "B" 470 may be provided at an external application, for example within a web browser, or it may be part of the UI of the testing application. The test case results are output data that are displayed in the generated test cases 480 table. The Table 480 includes details for executed test case, which include attributes such as test case ID 485, corresponding PATH_ID 490 to the test case, and a classification 495 for the test case result—"positive" or "negative" categories.

Figure 5:
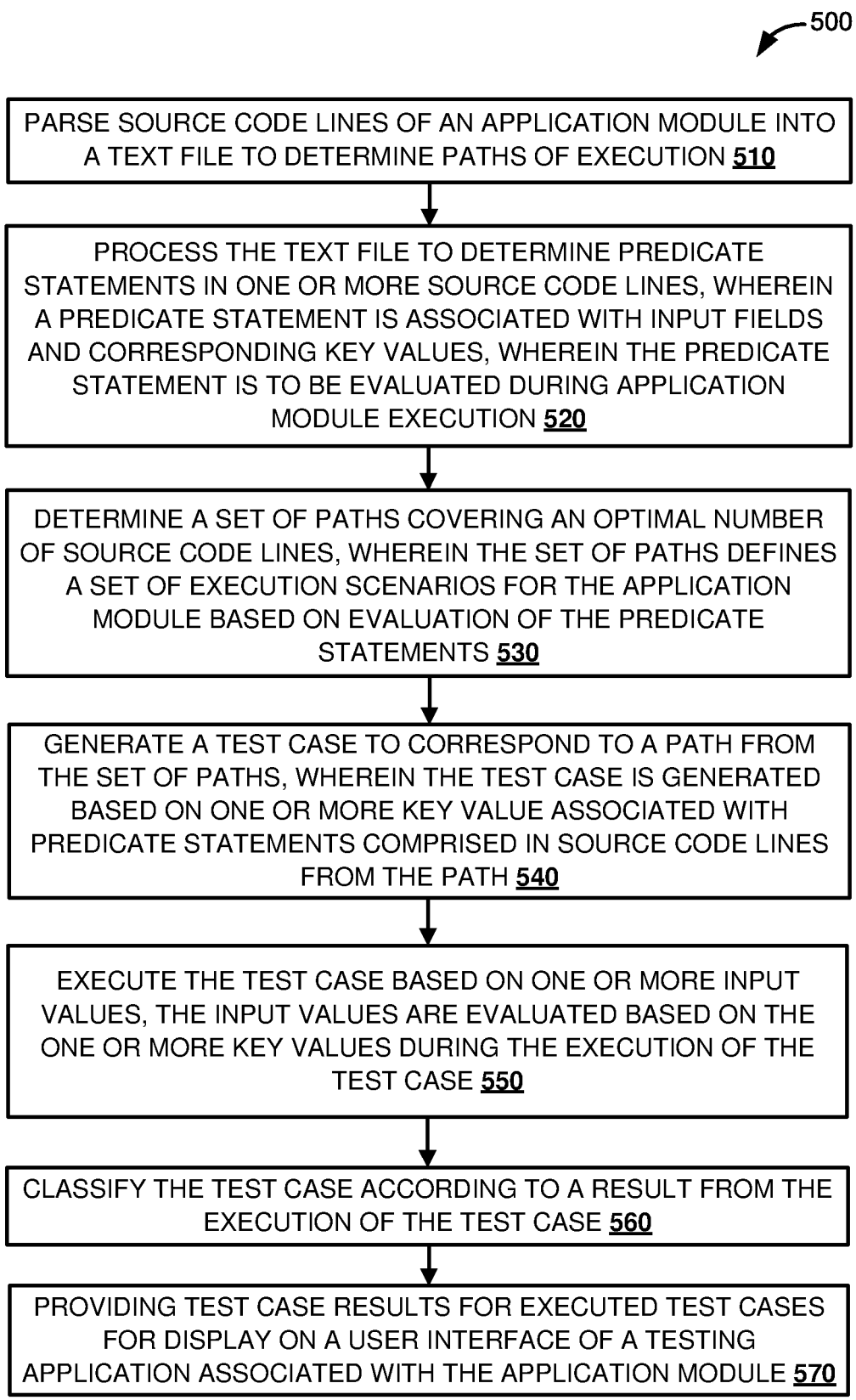
FIG. 5 is a flow diagram illustrating a process for determining application test results for an application based on automated path generation according to source code analysis, according to one embodiment.

FIG. 5 is a flow diagram illustrating a process 500 for determining application test results for an application based on automated path generation according to source code analysis, according to one embodiment. The determination of test result for an application based on automated path generation may include described implementations of source code evaluation, path generation and test case generation throughout the description of FIG. 1, FIG. 2, FIG. 3, and FIG. 4. At 510, source code lines of an application module are parsed into a text file to determine path of execution of the application module. The parsing may include reading of the application module provided for example as a deployable unit and storing the read source code lines into the text file, where the source code lines may be identified with their corresponding order number of line.

At 520, the text file is processed to determine predicate statement in one or more source code lines. The predicate statement may be such as the discussed predicate statement in relation to the description of embodiments herein for FIG. 1, FIG. 2, FIG. 3, and FIG. 4. The predicate statement is associated with input fields and corresponding key value included into the predicate statement. The predicate statement includes a condition that is evaluated during runtime of the application component. The evaluation may be performed based on input field values received from the input fields at an UI of the application module, as described above in relation to FIGS. 2 and 3. The performed evaluation may be associated with performing a comparison of the input field values and defined corresponding key values for the predicate statement.

At 530, a set of paths is determined to cover an optimal number of source code lines to be traversed. The set of paths may be defined based on a determination of a tree data structure including different sets of code lines associated based on an order of evaluation during application module's execution. The tree data structure including the set of paths may be such as the discussed tree data structure in the above description, for example in relation to FIG. 1 and FIG. 3. The set of paths define a set of execution scenarios for the application module based on evaluation for the predicate statements determined at 520. The determination of paths may be such as the described embodiments in relation to FIG. 2 and the path generator 240, and at block 350, FIG. 3.

At 540, a test case is generated to correspond to a path from the set of paths. More than one test case may be generated for a single path from the determined set. The test case is generated based on one or more key values associated with corresponding predicate statements comprised in source code lines from the path. The generation of the test case may be similar to the described test definition discussed in relation to the test case descriptor 250, FIG. 2. The generation of the test case may correspond to the generation of test cases discussed in relation to block 360, FIG. 3.

At 550, the test case is executed based on one or more input values. The input values may include values received for the input fields at the UI of the application module. The input fields may include internally defined fields within the source code line used for the definition of the implemented logic. The evaluation of the input fields is related to evaluation of source code lines included in the corresponding path, e.g. as nodes from the tree structure. The evaluated source code lines include predicate statements associated with one or more key values. Therefore, the input values may be evaluated based on the key values associated with the predicate statement during the execution of the test case. The test case execution may be performed at a running instance of the application module and/or at a simulated test environment for the application module associated with a testing application. At 560, the test case is classified according to a result from their execution. For example, the test case result may be classified as positive or negative as described above in relation to FIG. 2 and FIG. 4. At 570, test case results are provided for display on a UI of a testing application. Test case results are associated with already executed test cases from a defined list of test cases, including the generated test case at 540. The testing application may be an application including implemented logic for analysis of applications and corresponding source code to define testing scenarios based on automatic path generation according to evaluation of source code of the tested applications.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
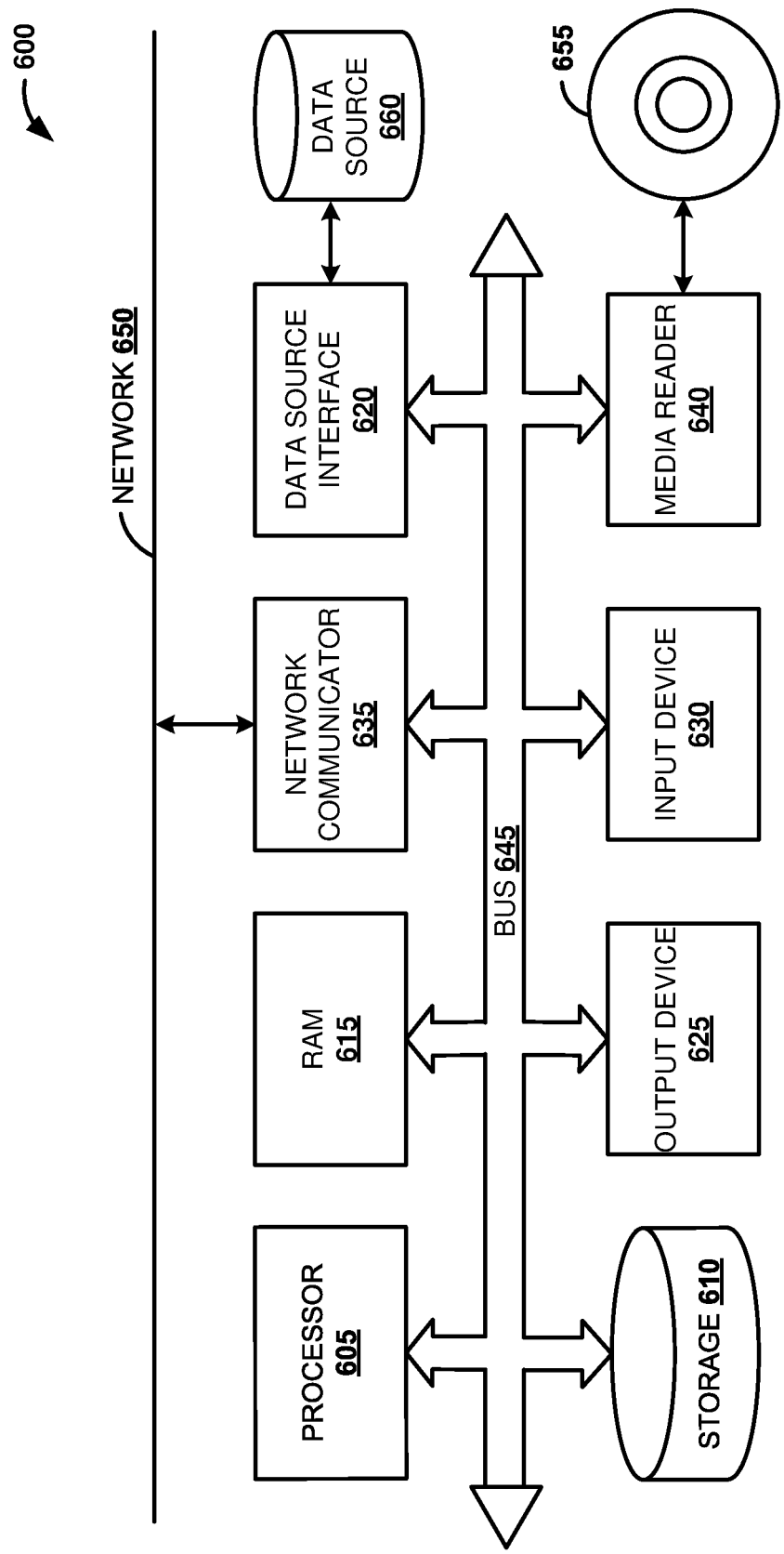
FIG. 6 is a block diagram illustrating an embodiment of a computing environment in which the techniques described for automated path generator for optimized application testing can be implemented.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method comprising:
   parsing, by a testing application, an application module in a text file format to identify, for a portion of a plurality of source code lines of the application module, wherein each source code line is identified with a corresponding line number;
   identifying predicate conditions from the source code lines;
   determining whether one or more key values are associated with each predicate condition of the identified predicate conditions, wherein the one or more key values are associated with a key field from key fields defined for and internal to the application module, wherein a predicate condition is associated with a set of source code lines that are traversed during execution of the application module when a received input field value at the application module complies with the predicate condition;
   determining a plurality of paths of execution of the application module, wherein a path of the plurality of paths indicates a plurality of specific line numbers from the source code lines, wherein the specific line numbers identify a subset of the portion of source code lines and correspond to an execution sequence of the application module, and wherein the path is determined based on at least one of the identified predicate conditions; and
   based on the determined key values for the predicate conditions and the determined plurality of paths of execution of the source code for the application module, generating one or more test cases, wherein a test case corresponds to the path and the at least one of predicate conditions defined at source code lines from the path.

2. The method of claim 1, further comprising:
   determining a set of key values for a predicate condition from the predicate conditions;
   wherein a key value is mapped to a key field value, and wherein the key field is an input field and the key field value is received at the input field of the application module when traversing the source code lines of the application module during execution.

3. The method of claim 1, wherein the plurality of paths is determined to cover an optimal number of source code lines of the application module.

4. The method of claim 1, wherein the path defines an order of execution of source code lines based on evaluation of one or more of the predicate conditions along the source code lines, wherein execution of a source code line is associated with at least one path from the plurality of paths.

5. The method of claim 1, further comprising:
   executing the test case from the generated test cases through a testing application based on provided one or more input values for one or more input fields defined in source code lines associated with the corresponding path;
   wherein the key field is an input field from the one or more input fields.

6. The method of claim 5, wherein the executing of the test case comprises:
   receiving one or more input values for the one or more input fields through a user interface of the testing application, wherein the testing application is defined for testing correctness of execution of the application module, and wherein a received input value for the key field is evaluated based on one or more key values associated with an associated predicate condition from the path evaluated during the execution of the test case.

7. The method of claim 5, further comprising:
classifying the test case according to a result from the execution of the test case.

8. The method of claim 7, further comprising:
providing test case results for executed test cases for display on a user interface of the testing application.

9. A computer system comprising:
a processor; and
a memory in association with the processor storing instructions related to:
parse, by a testing application, an application module in a text file format to identify, for a portion of a plurality of source code lines of the application module, wherein each source code line is identified with a corresponding line number;
identify predicate conditions from the source code lines;
determine whether one or more key values are associated with each predicate condition of the identified predicate conditions, wherein the one or more key values are associated with a key field from key fields defined for and internal to the application module, wherein a predicate condition is associated with a set of source code lines that are traversed during execution of the application module when a received input field value at the application module complies with the predicate condition;
determine a plurality of paths of execution of the application module, wherein a path of the plurality of paths indicates a plurality of specific line numbers from the source code lines, wherein the specific line numbers identify a subset of the portion of source code lines and correspond to an execution sequence of the application module, and wherein the path is determined based on at least one of the identified predicate conditions; and
based on the determined key values for the predicate conditions and the determined plurality of paths of execution of the source code for the application module, generate one or more test cases, wherein a test case corresponds to the path and the at least one of predicate conditions defined at source code lines from the path.

10. The system of claim 9, wherein the plurality of paths is determined to cover an optimal number of source code lines of the application module, and wherein the path defines an order of execution of source code lines based on evaluation of one or more of the predicate conditions along the source code lines, wherein execution of a source code line is associated with at least one path from the plurality of paths.

11. The system of claim 9, further comprising instructions related to:
executing the test case from the generated test cases through a testing application based on provided one or more input values for one or more input fields defined in source code lines associated with the corresponding path, wherein an input field is the key field and the one or more key values are mapped to an input field value received at the input field of the application module when traversing the source code lines of the application module during execution.

12. The system of claim 11, wherein the instructions related to the executing of the test case further comprising instructions related to:
receiving the one or more input values for the one or more input fields through a user interface of the testing application, wherein the testing application is defined for testing correctness of execution of the application module, and wherein the received input values are evaluated based on one or more key values associated with corresponding predicate conditions evaluated during the execution of the test case.

13. The system of claim 11, further comprising instructions related to:
classifying the test case according to a result from the execution of the test case; and
providing test case results for executed test cases for display on a user interface of the testing application provided at a display screen of a device.

14. A non-transitory computer-readable medium storing instructions, which when executed cause a computer system to:
parse, by a testing application, an application module in a text file format to identify, for a portion of a plurality of source code lines of the application module, wherein each source code line is identified with a corresponding line number;
identify predicate conditions from the source code lines;
determine whether one or more key values are associated with each predicate condition of the identified predicate conditions, wherein the one or more key values are associated with a key field from key fields defined for and internal to the application module, wherein a predicate condition is associated with a set of source code lines that are traversed during execution of the application module when a received input field value at the application module complies with the predicate condition;
determine a plurality of paths of execution of the application module, wherein a path of the plurality of paths indicates a plurality of specific line numbers from the source code lines, wherein the specific line numbers identify a subset of the portion of source code lines and correspond to an execution sequence of the application module, and wherein the path is determined based on at least one of the identified predicate conditions; and
based on the determined key values for the predicate conditions and the determined plurality of paths of execution of the source code for the application module, generate one or more test cases, wherein a test case corresponds to the path and the at least one of predicate conditions defined at source code lines from the path;
execute the test case from the generated test cases through a testing application based on provided one or more input values for one or more input fields defined in source code lines associated with the corresponding path, wherein an input field is a key field and the one or more key values are mapped to an input field value received at the input field of the application module when traversing the source code lines of the application module during execution; and
wherein the predicate condition is associated with a set of source code lines that are traversed during the execution of the application module when the received input field value at the application module complies with the predicate condition and corresponding one or more key values.

15. The computer-readable medium of claim 14,
wherein the testing application is defined for testing correctness of execution of the application module.

16. The computer-readable medium of claim 14, wherein the plurality of paths is determined to cover an optimal number of source code lines of the application module, and wherein the path defines an order of execution of source code lines based on evaluation of one or more of the predicate conditions along the source code lines, wherein execution of a source code line is associated with at least one path from the plurality of paths.

17. The computer-readable medium of claim 14, further comprising instructions which when executed cause the computer system to:
- classifying the test case according to a result from the execution of the test case;
- providing test case results for executed test cases for display on a user interface of the testing application provided at a display screen of a device; and
- wherein the instructions related to the executing of the test case further comprising instructions related to receiving the one or more input values for the one or more input fields through a user interface of the testing application, the received input values being evaluated based on one or more key values associated with corresponding predicate conditions evaluated during the execution of the test case.

* * * * *